United States Patent [19]

Hodara et al.

[11] Patent Number: 4,932,004
[45] Date of Patent: Jun. 5, 1990

[54] FIBER OPTIC SEISMIC SYSTEM

[75] Inventors: Henri Hodara, Altadena; Steve W. Braun, San Diego, both of Calif.

[73] Assignee: Honeywell Inc., Minneapolis, Minn.

[21] Appl. No.: 140,919

[22] Filed: Dec. 23, 1987

Related U.S. Application Data

[63] Continuation of Ser. No. 833,516, Feb. 21, 1986, abandoned, which is a continuation of Ser. No. 436,279, Oct. 25, 1982, abandoned.

[51] Int. Cl.$^5$ .............................................. G01V 1/00
[52] U.S. Cl. ................................. 367/76; 340/870.28; 250/227.11; 455/606; 455/607
[58] Field of Search .................. 181/112, 122; 367/13, 367/14, 20, 21, 76, 77, 78, 79, 80, 106, 117, 129, 130, 135, 140, 141, 149, 153, 154, 177, 178, 191; 340/850, 870.01, 871.11, 870.15, 870.27, 870.28, 870.29, 870.42; 350/96.15, 96.16, 96.29, 96.30; 364/421, 422; 250/227; 455/600, 606, 607

[56] References Cited

U.S. PATENT DOCUMENTS

| | | | |
|---|---|---|---|
| 3,851,302 | 11/1974 | Schmitt | 367/79 |
| 4,023,140 | 5/1977 | Siems et al. | 367/79 |
| 4,039,806 | 8/1977 | Fredriksson et al. | 367/76 X |
| 4,112,412 | 9/1978 | Howlett | 367/79 |
| 4,117,448 | 9/1978 | Siems | 367/79 |
| 4,140,993 | 2/1979 | Carter | 367/76 |
| 4,218,767 | 8/1980 | Joosten et al. | 367/79 |
| 4,231,015 | 10/1980 | Union | 364/200 X |
| 4,241,330 | 12/1980 | Hery et al. | 364/200 X |
| 4,296,484 | 10/1981 | Miller | 367/79 X |
| 4,301,521 | 11/1981 | Kelm | 367/78 |
| 4,312,051 | 1/1982 | Miller | 367/79 X |
| 4,313,192 | 1/1982 | Nelson et al. | 367/79 X |
| 4,360,729 | 11/1982 | Honey et al. | 367/76 X |
| 4,408,307 | 10/1983 | Harris | 367/76 X |
| 4,497,045 | 1/1985 | Miller | 367/78 |

OTHER PUBLICATIONS

Sheriff, R. E., Encyclopedic Dictionary of Exploration Geophysics, 1973, p. 65.
Stern, F., Light Pipe with Gain, IBM Technical Disclosure, vol. 8, No. 1, Jun. 1965, p. 132.

Primary Examiner—Brian S. Steinberger
Attorney, Agent, or Firm—W. T. Udseth

[57] ABSTRACT

A distributed geophone data acquisition system is disclosed that includes a receiver for the geophone data and a plurality of data cables connected together and to the receiver at one end. The cables have a plurality of twisted pairs of electrical conductor channels and two fiber optic light guides. Multiple geophone takeouts are connected to separate channels of the cables. Remote data units are connected between adjacent ends of each data cable that convert the geophone signals on each channel to light signals for transmitting through the fiber optic light guide of the next cable to the next remote data unit and ultimately to the receiver.

10 Claims, 3 Drawing Sheets

FIBER OPTIC SEISMIC SYSTEM

This application is a continuation of application Ser. No. 833,516, filed Feb. 21, 1986, now abandoned, which is a continuation of application Ser. No. 436,279, filed Oct. 25, 1982, now abandoned.

This invention relates to distributive seismic data acquisition systems generally and, in particular, to such a system in which the seismic data is transmitted most of the way to the recording station as light signals.

Geophysicists want to obtain seismic data from as many geophone groups as possible and systems having over a thousand geophone groups are contemplated. In the conventional system, where each geophone group transmits its seismic information back to a common recording station through a separate electrical channel, there is a practical limit to the number of conductors that can be placed in a cable before its weight becomes excessive. To overcome this problem, the "distributive" system has been developed. In this type system, remote data units (RDUs) are positioned along the traverse of the geophone spread. These units gather the analog electrical data from a limited number of geophone groups, they store, amplify, filter, and digitize the analog data to a compatible digital format. Upon command, they release the digital data for transmission back to a recording station or truck. In this way, the information can be sent from the RDUs to the recording station as a serial data stream on one channel.

Both systems transmit the information to the recording station either as analog electrical signals or as digital electrical signals. Thus, both systems are subject to the interferences common in the environment, such as power line interference.

It is an object of this invention to provide a distributive seismic data acquisition system in which the data are transmitted a minimum distance as an electrical signal.

It is another object of this invention to provide a distributive geophone data acquisition system in which the analog data from each geophone group travels as an electrical signal a short distance through a data cable to a remote data unit that transmits samples of this signal as digital light signals through the next data cable assembly to the adjacent remote data unit nearest the recording station and eventually to the recording station.

It is a further object of this invention to provide a data cable assembly having twisted pairs of conductors to provide channels for connecting to geophone groups and two fiber optic light guides that allow the cable to transmit light signals in either direction so that the cable does not have to be oriented in any particular direction with respect to the recording unit when it is being strung along the ground in the field.

It is another object of this invention to provide a distributive geophone data acquisition system wherein each remote data unit (RDU), upon a command from the recording unit, samples the incoming data from the geophones connected directly to it, transmits this data toward the recording station, and retransmits data received from more remote RDU's until all of the samples have reached the recording station before another sample command is sent to the RDU's by the recording unit.

These and other objects, advantages, and features of this invention will be apparent to those skilled in the art from a consideration of this specification, including the attached drawings and appended claims.

Figure 1:
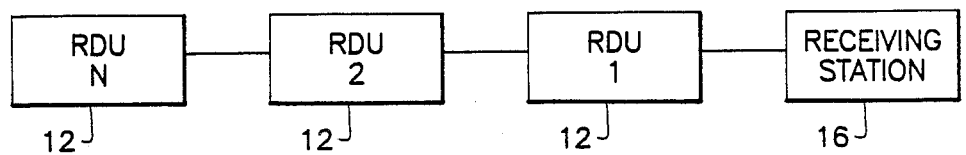
FIG. 1 is a schematic diagram of a distributive seismic data acquisition system.
Figure 2:
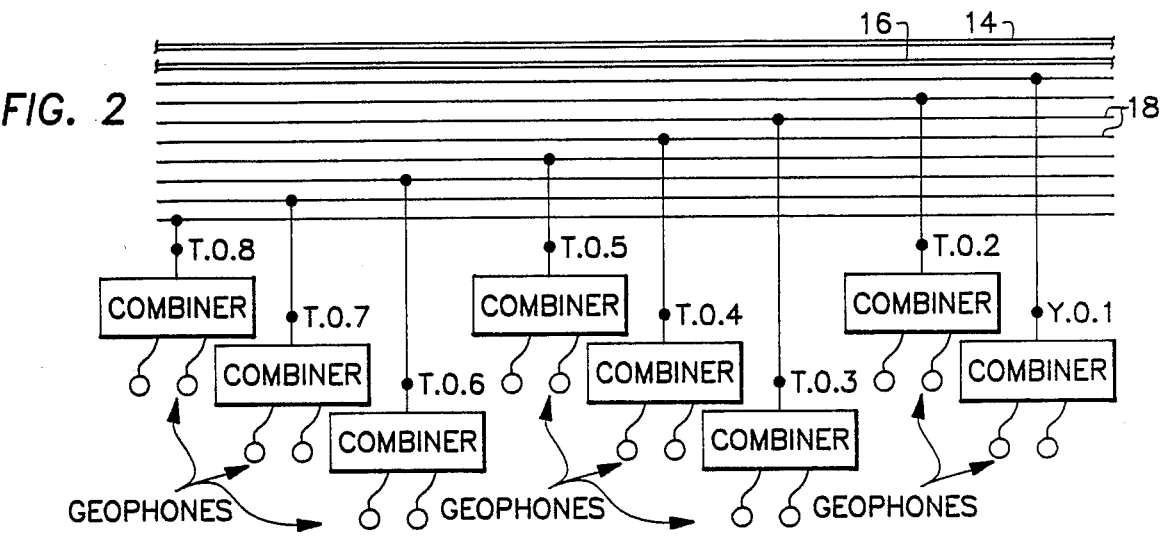
FIG. 2 is a simplified drawing of the takeout channels and fiber optic light guides of the cables employed in the system of FIG. 1.

The system shown in FIG. 1 includes receiving and recording station or truck 10 and a plurality of remote data units (RDU) 12 connected in series to the receiving station. The cable connecting the RDU's is shown diagrammatically in FIG. 2. It includes two fiber optic light guides, 14 and 16, and eight twisted pairs of electrical conductors, 18. Each twisted pair is connected through a takeout (T.O.) to a plurality of geophones connected so that their outputs are combined and fed back through the takeout to the twisted pair to which they are connected.

In the embodiment shown, eight takeouts and eight twisted pairs are used between each RDU. The seismic data, produced as electrical analog signals by the geophones, is transmitted through the twisted pairs to the adjacent RDU that is closest to the receiving station. In other words, the geophone takeouts in the cable section between RDU-1 and RDU-2 will be electrically connected to RDU-1.

Figure 3:
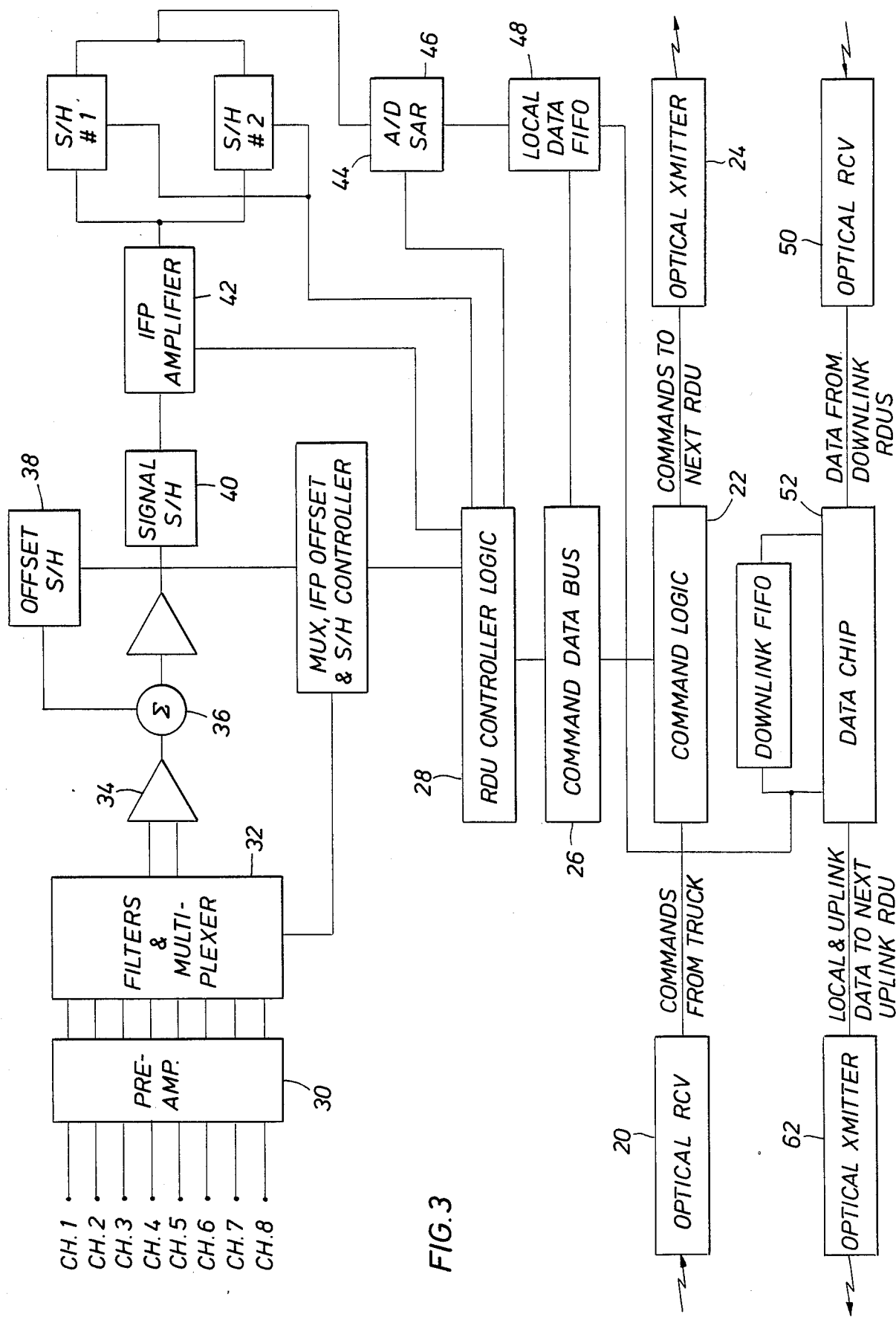
FIG. 3 is a block diagram of the circuits in a remote data unit.

FIG. 3 is a block diagram of the preferred embodiment of the RDU for practicing this invention.

The RDUs perform various functions in the system. Each receives the electrical analog signals from the geophones associated with it. In the embodiment shown, each RDU will be receiving such signals from eight separate channels. This seismic information is received continuously, while a survey is being conducted. Since all of the information received by the RDUs cannot be sent back to the truck only samples of the signal on each geophone channel will be sent from which the entire signal can be reconstructed.

Although only two are necessary, it is common practice to have a minimum of four samples each cycle. If, for example, all frequencies above a given frequency are to be filtered out, then the timing of the samples is based on four samples per cycle of the highest frequency.

Each sampling of seismic data is started by a command from the receiving station or truck that is transmitted through one of the fiber optic light guides to the RDUs. In one embodiment of the invention, the command format is defined around an 8-bit byte, preceded by a start bit and followed by a stop bit. The start bit is a one and the stop bit is a zero. The LSB is transmitted first, the MSB is transmitted last. The data rate is 384 kilobits per second.

To maintain compatibility with the fiber optic receiver, the command data are frequency modulated to allow AC coupling between stages. The frequency of a zero bit is at twice the frequency of a one. The modulated signal is produced by clocking a flip flop at the beginning of every bit and again in the middle of every zero bit. The string of stop bits between command strings results in the transmission of a 384 kilohertz squarewave. A string of ones would produce a 768 kilohertz squarewave. Transmission from the receiving station consists of a number of byte pairs. Each pair consists of eight data bits and eight command bits. The first byte pair transmitted per frame must consist of eight zeros and then the load command. The transceiver in the RDU's is arranged so that if there are more than fifteen consecutive ones the next received byte it incremented. The first byte transmitted per frame therefore becomes the module number after being incremented by each module from the truck.

For example, the command signal would be preceded by a series of at least fifteen ones, 11111_____, followed by a start bit 0, then eight bits that represent the RDU number, another stop bit, a start bit followed by the 8 bit command word and a series of stop bits until the next command is sent. The signal sent by the truck would be as follows:

_(15) 11111/0/00000000/10101010/101111_____

The first RDU would increment the module number byte and send the following to the second RDU:

_(15)_11111/0/10000000/10101010/101111_____

The second downlink RDU would send:

_(15)_11111/0/01000000/10101010/10111_____

More than one command byte will probably be sent. The commands can be used to adjust pre-amp and IFP amplifier gain, sample and hold, and transmit data to the truck. In addition, the RDUs can be commanded to conduct certain tests on the circuits and to measure such things as the temperature inside the RDU and the voltage of its batteries.

One command is used to start the sequence of operations of collecting the sample of seismic data being received from the geophones. As shown in FIG. 3, the incoming command from the truck is first converted from light signals to electrical signals in optical receiver 20. The command signal then goes to command logic 22, which transmits the command as an electrical signal to optical transmitter 24 after incrementing the RDU number. The signal is converted to light signals and transmitted through one of the fiber optic light guides to the next down-link RDU.

The command signal is also sent from command logic 22 to command data bus 26, then to controller 28. The command is to sample a portion of each of the geophone signals coming in through the eight takeout channels. The signals from the eight channels go through pre-amp 30, then to filters and multiplexer 32.

The multiplexed signals from the eight channels pass successively through differential amplifier 34. The sample for each channel is adjusted for IFP and A/D offset in summation circuit 36. The amount of the offset for each channel has been determined previously and stored in offset sample and hold 38. The signals are adjusted for the IFP offset and the offset of the A/D invention prior to passing through the IFP amplifier and analog/digital converter. In this manner no correction of the digital signals for offset is required. For a complete description of this portion of the circuit see co-pending patent application Serial No. 427,489, filed on the day of Sept. 29, 1982, and entitled "IFP Amplifier".

The signals from each channel pass successively into signal sample and hold 40, then through IFP amplifier 42 to sample and hold No. 1 or No. 2. While one of the sample and holds is receiving data the other is sending its data through analog digital converter 44 and successive approximation register (SAR) 46 to local data FIFO 48.

Figure 4:
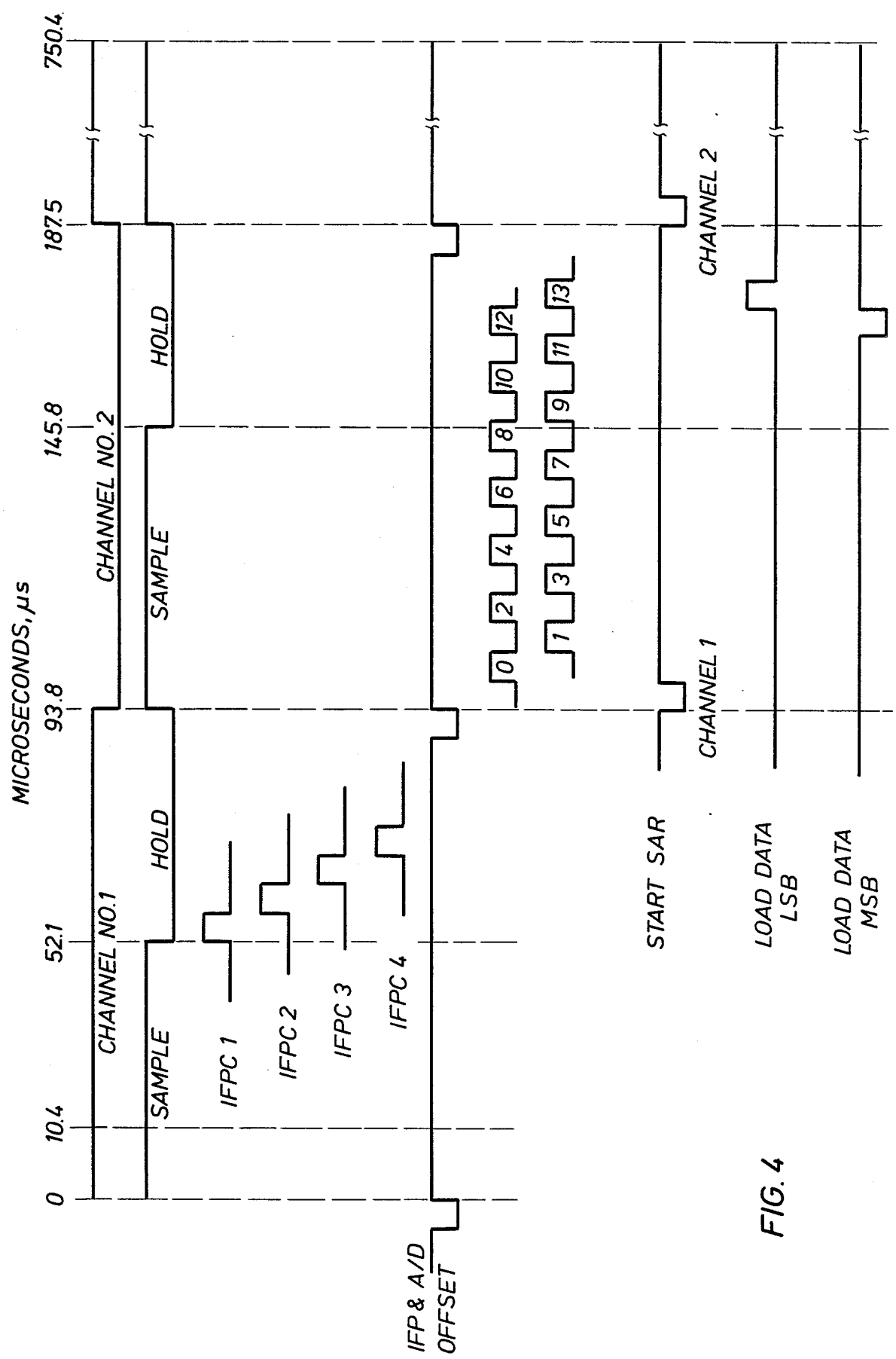
FIG. 4 shows the timing sequence for sampling the eight geophone channels.

The local data FIFO stores one sample of each seismic channel and is updated every sample period. In operation the truck will send a signal called an "unload" command as described above that will include the RDU number, the unload command, and a series of one's for a preselected period of time. This time period is selected to allow the RDUs sufficient time to sample all eight channels with a sample window of adequate width. As shown in FIG. 4, in this embodiment a sample time per channel of 52.1 microseconds is used.

Immediately before the sampling begins, the IFP and analog digital offset correction is applied to offset sample and hold 38 so that as the sample of channel 1 is taken it will be corrected for offset. After the unload signal is received a sample is taken of the signal in channel 1 for 52.1 microseconds. Between 52.1 microseconds and 93.8 microseconds, this signal passes through the IFP amplifier. This is shown schematically in a time sequence extending slightly beyond half of the time period to allow the signal, as it reaches each of the four cascaded amplifiers to be compared with a known preset voltage to determine whether or not the signal should be amplified or not. The signal then passes into one or the other of sample and hold No. 1 and No. 2 and is allow to settle for the remainder of the time period.

Just prior to the end of the 93.8 second period, the IFP and analog/digital offset for channel 2 is placed in the offset sample and hold. Then between 93.8 and 145.8 microseconds, channel 2 is sampled. It passes through the IFP amplifier and into the other of the sample and holds. For example, if channel 1 was being held in sample and hold No. 1, then the sample of channel 2 would go into No. 2. During the period that channel 2 is being sampled, the sample of channel 1 in sample and hold No. 1 moves out of the sample and hold through SAR and analog/digital converter, there the analog signal is converted into fourteen bits of information, as shown in FIG. 4, and stored in the local data FIFO. While channel 3 is being sampled, the sample of channel 2 will also be digitized and stored in the local data FIFO. This continues until all eight channels have been sampled and the samples digitized and stored in the local data FIFO. The movement of the digitized information for each channel to the FIFO is controlled by signals from the RDU controller designated "load data LSB" and "load data MSB" as shown in FIG. 4. If the unload commands are sent from the truck every millisecond, then the eight channels can be sampled in the time allowed between commands with some time left over. If the situation is such that for one reason or another it is desirable to obtain samples of a signal more often than once every millisecond, then if the command to sample is sent every 0.5 milliseconds and the RDUs will sample the first four channels during the time allowed before the next unload command is received, at which time they will again sample the first four channels only. As a result, the frequency of samples will be doubled but they will be of four channels only. If the interval between unload and sample commands is increased to, say, two or four milliseconds, the RDU would simply go through its sequence and then do nothing for a period of time until the next unload command is received.

During the time each RDU is gathering its eight samples from the eight channels of seismic information, the previously collected samples are all transmitted to the truck. In the embodiment shown, each RDU transmits the local data in the FIFO immediately upon receipt of a command to begin another sampling cycle. The local data from RDU No. 1, the closest to the truck, goes immediately to the truck. The local data from all the other RDUs has to pass through the RDUs between them and the truck, and this is accomplished as shown in FIG. 3. The data from the downlink RDUs is received by optical receiver 50, which converts the light signals to electrical signals and sends them to data chip 52. Each RDU transmits twenty-one 8-bit bytes. Twenty words or 160 bits contain the information obtained from the eight channels of seismic information. The remaining one byte comprises a sync signal, which precedes the seismic data information. In the embodiment shown, the data is transmitted using a Manchester code.

Figure 5:
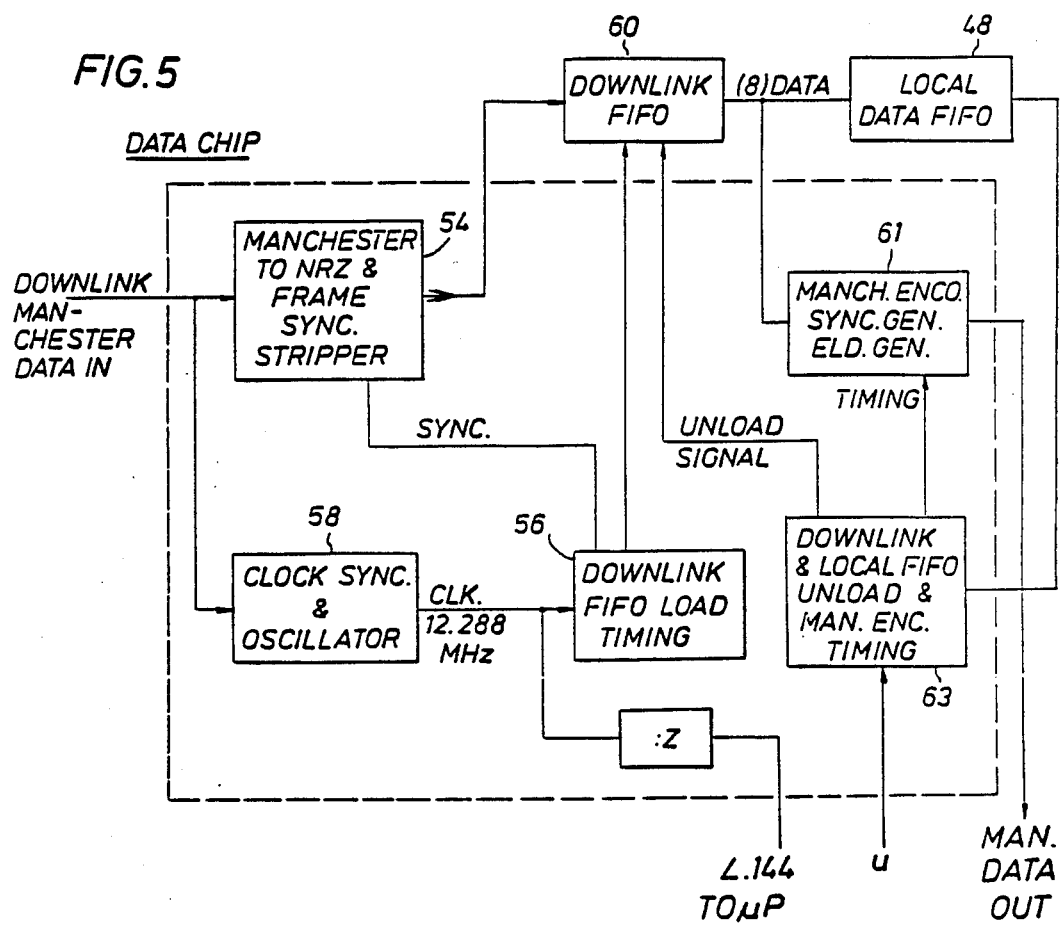
FIG. 5 is a block diagram of the data chip shown in FIG. 3.

As shown in FIG. 5, Manchester to NRZ converter 54 of the data chip receives the downlink Manchester data. The seismic data is converted to NRZ code, and the sync information is separated from the seismic data and sent to downlink FIFO load timing circuit 56. Oscillator 58 continuously receives data signals from the incoming data that keep oscillator 58 in sync with the timing of the information that it is receiving from the downlink RDUs. Oscillator 58 provides the clock for the operation of the RDU with which it is associated. The seismic data from downlink is stored in downlink FIFO 60, and after the local data FIFO has unloaded its information, the downlink FIFO will unload the downlink information into Manchester encoder and sync generator 61 from which it will be transmitted up link to the next RDU or the truck.

After the local data FIFO is emptied, all incoming data from downlink RDUs will be continuously passed through the data chip to the truck so that all information will be in the truck before the next unload command signal is received by the RDUs. The Manchester data and sync signal leaving the data chip is converted in optical transmitter 62 to light signals and sent through one of the light guides in the cable to the next RDU or the truck.

The timing of the unloading of the local and downlink FIFO's and Manchester encoder 61 is controlled by timing circuit 63. It is actuated upon receipt of the unload command "M."

The timing for all of the RDUs is controlled by the oscillator in the RDU that is farthest from the truck. This RDU will not receive any sync signals from other RDUs, so its oscillator will run free sending continuous sync signals toward the truck that will control the clocks in all of the RDUs between it and the truck.

From the foregoing, it will be seen that this invention is one well adapted to attain all of the ends and objects hereinabove set forth, together with other advantages that are obvious and that are inherent to the apparatus and structure.

It will be understood that certain features and subcombinations are of utility and may be employed without reference to other features and subcombinations. This is contemplated by and is within the scope of the claims.

Because many possible embodiments may be made of this invention without departing from the scope thereof, it is to be understood that all matter herein set forth or shown in the accompanying drawings is to be interpreted as illustrative and not in a limiting sense.

The invention having been described, what is claimed is:

1. A distributed geophone data acquisition system including a plurality of geophones, said system comprising:

control means for receiving data from said geophones, and for generating optical control signals for said system;

a plurality of data cables, wherein each of said cables includes two fiber optic light guides and a plurality of twisted pairs of electrical conductor channels;

a plurality of electrical conductor takeouts, wherein each of said takeouts is connected to and between one of said channels in one of said data cables and at least one of said geophones;

a plurality of remote data units for receiving electrical data signals from said geophones and said optical controls signals from said control means, and for transmitting geophone data and said optical control signals along said cables, wherein said remote data units are connected in series with one of said data cables connected between each pair of adjacent remote data units and another one of said data cables connected between one of said remote data units and said control means, wherein none of said data cables is directly connected to more than two remote data units, wherein each of said remote data units includes means for converting said electrical data signals to optical data signals and means for converting said optical control signals to electrical control signals, wherein each of said data cables is connected so that one of said two fiber optic light guides will transmit said optical control signals but will not transmit said optical data signals, and the other of said two fiber optic light guides will transmit said optical data signals but will not transmit said optical control signals and wherein the simultaneous, bidirectional transmission of said optical control signals and said optical data signals can occur through said data cables.

2. The system of claim 1 wherein:

said series of remote data units includes a first remote data unit connected by one of said data cables to said control means, a terminal remote data unit which is the last remote data unit in said series and which is connected by one of said data cables to only one other of said remote data units, and wherein the remainder of said remote data units are intermediate remote data units and are each connected by a first one of said data cables to a first adjacent remote data unit and by a second one of said data cables to a second adjacent remote data unit, wherein none of said data cables is directly connected to more than two of said remote data units; and said means for converting said electrical data signals to optical data signals includes first and second electrical to optical converters, and said means for converting said optical control signals to electrical control signals includes first and second optical to electrical converters, wherein each of said intermediate remote data unit connects one of said two fiber optic light guides in said first one of said cables to said first electrical to optical converter, connects the other of said two fiber optical light guides in said first one of said cables to said first optical to electrical converter, connects one of said two fiber optic light guides in said second one of said cables to said second electrical to optical converter and connects the other of said two fiber optic light guides in said second one of said cables to said second optical to electrical converter.

3. The system of claim 1 wherein said geophones generate data in analog form and said remote data units further include means to convert said analog data to digital data.

4. The system of claim 1 wherein each of said remote data units further includes means for storing data from geophones connected to each of said remote data units for a specified time interval in response to a first of said control signals, and means for transmitting said stored data in response to a second of said control signals.

5. The system of claim 1 wherein each of said remote data units further includes:
   means for receiving samples of analog seismic data from a plurality of said geophones, wherein said analog seismic data for each geophone is received along a separate channel;
   means for multiplexing said analog seismic data received on said separate channels;
   means for storing a predetermined analog to digital conversion offset signal for each of said channels;
   means for adjusting said analog seismic data on each of said separate channels with said predetermined analog to digital conversion offset signal corresponding to each of said separate channels;
   means for converting said adjusted analog seismic data to digital data;
   means for storing said digital data in preparation for transmission to said control means.

6. The system of claim 5 wherein each of said remote data units also includes:
   means for storing a predetermined instantaneous floating point amplifier offset signal for each of said channels; and
   means for adjusting said analog seismic data on each of said separate channels with said predetermined instantaneous floating point amplifier offset signal corresponding to each of said separate channels.

7. The system of claim 1 wherein each of said remote data units further includes:
   means for storing geophone data from said geophones which are directly connected to the remote data unit; and
   means for storing geophone data from other remote data units which are farther from said control means than the remote data unit.

8. The system of claim 1 wherein each of said remote data units includes an oscillator, and wherein the timing of functions of data processing circuits within all of the remote data units is controlled by the oscillator in the remote data unit which is farthest from said control means.

9. A distributed geophone data acquisition system including a plurality of geophones, said system comprising:
   control means for receiving data from said geophones, and for generating optical control signals for said system;
   a plurality of data cables, wherein each of said cables includes two fiber optic light guides and a plurality of twisted pairs of electrical conductor channels;
   a plurality of electrical conductor takeouts, wherein each of said takeouts is connected to and between one of said channels and at least one of said geophones;
   a plurality of remote data units for receiving electrical data signals from said geophones and said optical control signals from said control means, and for transmitting geophone data and said optical control signals along said cables, wherein said remote data units are connected in series with one of said data cables connected between each pair of adjacent remote data units and another one of said data cables connected between one of said remote data units and said control means, wherein none of said data cables is directly connected to more than two of said remote data units, wherein each of said remote data units includes means for converting said electrical data signals to optical data signals and means for converting optical control signals to electrical control signals, wherein each of said data cables is connected so that a first path is provided between said control means and said remote data units along one of said two fiber optic light guides in each of said data cables, wherein said optical control signals are transmitted from said control means to said remote data units along said first path but said optical data signals are not transmitted along said first path, and a second path is provided between said control means and said remote data units along the other of said two fiber optic light guides in each of said data cables wherein said optical data signals are transmitted from said remote data units toward said control means along said second path but said optical control signals are not transmitted along said second path and wherein the simultaneous bidirectional transmission of said optical control signals and said optical data signals can and, at selected times, does occur through said data cables.

10. A method of acquiring geophone data at a control station in a seismic system, said control station generating control signals and said system including a plurality of remote data units connected in series by data cables, wherein each of said remote data unit can perform optoelectrical conversion on said control signals and said geophone data signals, each of said data cables includes two fiber optic light guides and each of said data cables is connected to at least one geophone, comprising:
   transmitting electrical geophone data to said remote data units;
   converting said electrical geophone data to optical data
   transmitting said optical data from said remote data units to said control station along a first path including only one of said two fiber optic light guides in any of said data cables between the remote data unit transmitting said optical data and said control station;
   and transmitting control signals from said control station to said remote data units along a second path including only said fiber optic light guides in said data cables which are not included in said first path, wherein at selected times some of said control signals are transmitted simultaneously with said optical data.

* * * * *